United States Patent
Hikita (10) Patent No.: US 11,807,044 B2
(45) Date of Patent: Nov. 7, 2023

(54) MOTORCYCLE TIRE FOR ROUGH TERRAIN

(71) Applicant: Sumitomo Rubber Industries, Ltd., Kobe (JP)

(72) Inventor: Masahiro Hikita, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 197 days.

(21) Appl. No.: 17/165,497

(22) Filed: Feb. 2, 2021

(65) Prior Publication Data

US 2021/0300124 A1 Sep. 30, 2021

(30) Foreign Application Priority Data

Mar. 24, 2020 (JP) .................. 2020-053036

(51) Int. Cl.
*B60C 11/11* (2006.01)
*B60C 11/13* (2006.01)
*B60C 11/03* (2006.01)

(52) U.S. Cl.
CPC .......... *B60C 11/11* (2013.01); *B60C 11/0302* (2013.01); *B60C 11/1369* (2013.01); *B60C 2011/1338* (2013.01); *B60C 2200/10* (2013.01); *B60C 2200/14* (2013.01)

(58) Field of Classification Search
CPC . B60C 11/11; B60C 11/1369; B60C 11/0302; B60C 2011/1338; B60C 2200/10; B60C 2200/14
See application file for complete search history.

(56) References Cited

U.S. PATENT DOCUMENTS

| 4,311,179 A * | 1/1982 | Hayakawa | B60C 11/13 152/209.15 |
| 2003/0047261 A1* | 3/2003 | Matsumura | B60C 11/033 152/209.2 |
| 2012/0018067 A1* | 1/2012 | Hikita | B60C 11/11 152/209.8 |
| 2016/0075186 A1 | 3/2016 | Tamura | |

(Continued)

FOREIGN PATENT DOCUMENTS

| EP | 2412546 A1 | 2/2012 |
| EP | 3375632 A1 * | 9/2018 ......... B60C 11/0302 |
| EP | 3611037 A1 | 2/2020 |

(Continued)

OTHER PUBLICATIONS

Extended European Search Report, dated Jun. 23, 2021, for European Application No. 21162532.2.

Primary Examiner — Justin R Fischer
Assistant Examiner — Philip N Schwartz
(74) Attorney, Agent, or Firm — Birch, Stewart, Kolasch & Birch, LLP (57) ABSTRACT

A motorcycle tire for running on rough terrain includes a tread portion. The tread portion includes a base surface and a plurality of blocks. The blocks include a crown block arranged on a tire equator side and a shoulder block arranged on a tread edge side. A height of the shoulder block from the base surface is larger than a height of the crown block from the base surface. The shoulder block is provided on the base surface side with a base portion that has a locally increased cross-section taken along the base surface.

18 Claims, 6 Drawing Sheets

(56) References Cited

U.S. PATENT DOCUMENTS

2016/0236516 A1 * 8/2016 Sueishi .................. B60C 11/11

FOREIGN PATENT DOCUMENTS

| GB | 324825 A | * | 2/1930 | ............. B60C 11/11 |
| GB | 1441651 A | * | 7/1976 | ............. B60C 11/11 |
| JP | 2008279996 A | * | 11/2008 | ......... B60C 11/0083 |
| JP | 2016-60347 A | | 4/2016 | |

* cited by examiner

MOTORCYCLE TIRE FOR ROUGH TERRAIN

TECHNICAL FIELD

The present invention relates to a motorcycle tire for running on rough terrain.

BACKGROUND ART

Japanese Unexamined Patent Application Publication No. 2016-060347 (Patent Document 1) has proposed a motorcycle tire for running on rough terrain having improved traction performance on rough terrain and improved transient characteristic during cornering by improving an arrangement of crown blocks and middle blocks.

PRIOR ART DOCUMENT

Patent Document

Patent Document 1

Japanese Unexamined Patent Application Publication No. 2016-060347

SUMMARY OF THE INVENTION

Problems to be Solved by the Invention

In recent years, there has been a demand for motorcycle tires for running on rough terrain capable of exerting excellent performance on various road surfaces. Particularly, on such a soft road surface that even shoulder blocks of a tread portion come into contact with the road surface during running straight (hereinafter, such a road surface is referred to as a "soft road surface"), there has been a demand for improvement in traction performance and cornering performance.

As a result of various studies on this point, the inventor has found that the traction performance and the cornering performance on a soft road surface can be improved by improving the crown blocks and the shoulder blocks, and have completed the present invention.

The present invention was made in view of the above, and a primary object thereof is to provide a motorcycle tire for running on rough terrain capable of exerting excellent traction performance and cornering performance on a soft road surface.

Means for Solving the Problems

The present invention is a motorcycle tire for running on rough terrain including a tread portion, wherein the tread portion includes a base surface and a plurality of blocks protruding outward in a tire radial direction from the base surface, the blocks include a crown block arranged on a tire equator side and a shoulder block arranged on a tread edge side, a height (hs) of the shoulder block from the base surface is larger than a height (hc) of the crown block from the base surface, and the shoulder block is provided on the base surface side with a base portion that has a locally increased cross-section taken along the base surface.

In the motorcycle tire for running on rough terrain according to the present invention, it is preferred that the height (hs) is 105% or more and 150% or less of the height (hc).

In the motorcycle tire for running on rough terrain according to the present invention, it is preferred that the blocks include a middle block arranged between the crown block and the shoulder block, and the tread portion includes a shoulder tie bar formed by the raised base surface and connecting the shoulder block and the middle block.

In the motorcycle tire for running on rough terrain according to the present invention, it is preferred that the shoulder tie bar is connected to the base portion.

In the motorcycle tire for running on rough terrain according to the present invention, it is preferred that a height of the shoulder tie bar is smaller than a height of the base portion.

In the motorcycle tire for running on rough terrain according to the present invention, it is preferred that the shoulder block is connected with only one shoulder tie bar.

In the motorcycle tire for running on rough terrain according to the present invention, it is preferred that the blocks include a middle block arranged between the shoulder block and the crown block, and a height (hm) of the middle block from the base surface is smaller than the height (hs).

In the motorcycle tire for running on rough terrain according to the present invention, it is preferred that the blocks include a middle block arranged between the shoulder block and the crown block, and the tread portion includes a shoulder tie bar formed by the raised base surface and connecting the shoulder block and the middle block, and a crown tie bar formed by the raised base surface and connecting the crown block and the middle block.

Effects of the Invention

The motorcycle tire for running on rough terrain of the present invention can exert excellent traction performance and excellent cornering performance on a soft road surface by employing the above configuration.

MODE FOR CARRYING OUT THE INVENTION

An embodiment of the present invention will now be described in conjunction with accompanying drawings.

Figure 1:
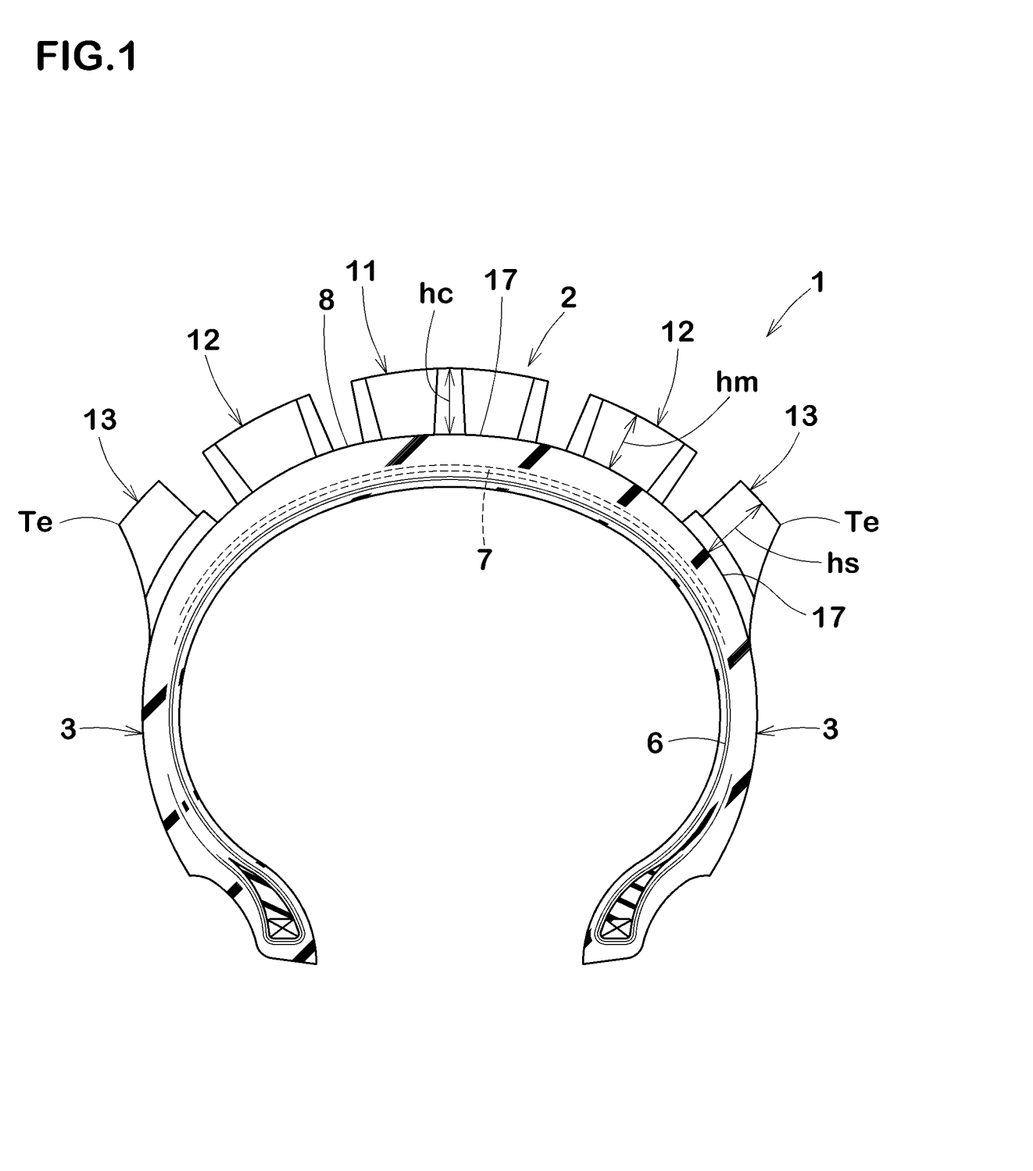
FIG. 1 a lateral cross-sectional view showing an embodiment of a motorcycle tire for running on rough terrain according to an embodiment of the present invention.
Figure 2:
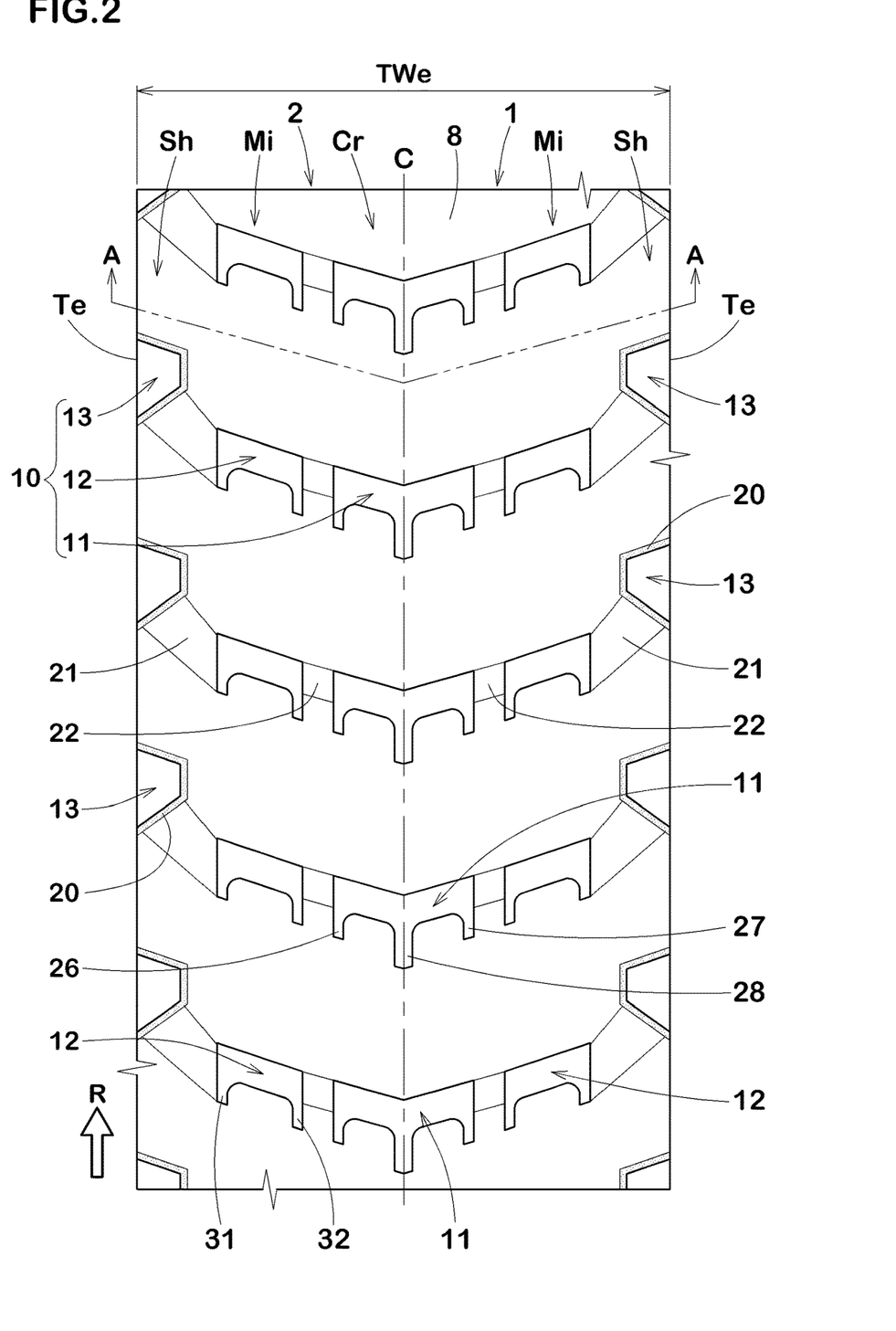
FIG. 2 a development view showing a tread pattern of a tread portion of FIG. 1.

FIG. 1 shows a lateral cross-sectional view of a motorcycle tire for running on rough terrain (hereinafter may be referred to simply as "tire") 1, which represents an embodiment of the present invention, in a standard state. FIG. 2 is a development view of a tread pattern of a tread portion 2 of the tire 1. FIG. 1 is a cross-sectional view taken along A-A line of FIG. 2, which is a tire meridian section passing through a tire rotational axis.

In the case of a tire for which various standards are defined, the "standard state" is a state in which the tire 1 is mounted on a standard rim, inflated to a standard inner pressure, and loaded with no tire load. In the case of a tire for which various standards are not defined, the standard state means a standard usage state according to the purpose of use of the tire and loaded with no tire load. In the present specification, unless otherwise specified, the dimensions and the like of various parts of the tire are values measured in the standard state. Further, if there is a slight difference in the dimensions of various parts of the tire depending on the measurement position, unless otherwise specified, each dimension shown in the present specification shall mean the median value between the minimum value and the maximum value. Furthermore, each configuration described herein shall allow for normal errors contained in rubber molded products.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard inner pressure" is air pressure specified for the concerned tire by a standard included in a standardization system on which the tire is based, for example, the maximum air pressure in JATMA, maximum value listed in the "TIRE LOAD LIMITS AT VARIOUS COLD INFLATION PRESSURES" table in TRA, and "INFLATION PRESSURE" in ETRTO.

As shown in FIG. 1, the tire 1 of the present invention is suitably used as a tire for motocross competition, for example. The tire of the present embodiment is suitably used as a tire for a rear wheel of a motocross vehicle, for example. However, the present invention is not limited to such an embodiment. In the cross section of the tread portion 2 of the tire 1 of the present embodiment, an outer surface thereof is curved in an arc shape convex outward in a tire radial direction.

The tire 1 of the present embodiment is provided with a carcass 6 and a tread reinforcing layer 7, for example. Known configurations are appropriately adopted for these.

As shown in FIG. 2, the tread portion 2 includes a directional pattern in which a rotational direction (R) is specified, for example. The rotational direction (R) is displayed in letters or symbols on sidewall portions 3 (shown in FIG. 1), for example. However, the present invention is not limited to such an embodiment. It should be noted that in some of the figures herein, the rotational direction (R) is indicated by an arrow.

The tread portion 2 is divided into a crown region (Cr), middle regions (Mi), and shoulder regions (Sh), for example.

The crown region (Cr) is a region centered on a tire equator (C) and having a width of ⅓ of a tread development width (TWe). The shoulder regions (Sh) are regions each having a width of ⅙ of the tread development width (TWe) from a respective one of tread edges (Te) toward the tire equator (C). The middle regions (Mi) are regions each between the crown region (Cr) and a respective one of the shoulder regions (Sh).

The tread development width (TWe) is a distance between the tread edges (Te) in a tire axial direction when the tread portion 2 is developed on a plane. The tread edges (Te) means axially outer edges of blocks included in block rows located axially outermost on both sides among the blocks arranged in the tread portion 2.

The tread portion 2 includes a base surface 8 and a plurality of blocks 10 protruding radially outward from the base surface 8. The blocks 10 of the present embodiment includes a plurality of crown blocks 11 arranged on a tire equator (C) side, a plurality of shoulder blocks 13 arranged on tread edge (Te) sides, and a plurality of middle blocks 12 arranged between them. In each of the crown blocks 11, a centroid of a ground contacting surface is located in the crown region (Cr). In a preferred embodiment, the crown blocks 11 are provided on the tire equator (C). In each of the middle blocks 12, the centroid of the ground contacting surface is located in one of the middle regions (Mi). Further, the middle blocks 12 are adjacent to the crown blocks 11. In each of the shoulder blocks 13, the centroid of the ground contacting surface is located in one of the shoulder regions (Sh). Further, the shoulder blocks 13 are adjacent to the middle blocks 12.

Each of widths in the tire axial direction of the crown blocks 11 is 20% or more and 30% or less of the tread development width (TWe), for example. Each of widths in the tire axial direction of the middle blocks 12 is 10% or more and 20% or less of the tread development width (TWe), for example. Each of widths in the tire axial direction of the shoulder blocks 13 is 8% or more and 15% or less of the tread development width (TWe), for example. However, the present invention is not limited to such an embodiment.

As shown in FIG. 1, a height (hs) of each of the shoulder blocks 13 from the base surface 8 is larger than a height (hc) of each of the crown blocks 11 from the base surface 8. Each of the height (hs) and the height (hc) corresponds to a minimum distance between a height reference surface 17 and the centroid of the ground contacting surface of a respective one of the blocks 10. The height reference surface 17 is a surface as a reference when the heights of the blocks 10 are measured, and includes the base surface 8 and virtual surfaces obtained by extending the base surface 8 to root portions of the blocks 10. Each of the virtual surfaces is a virtual surface surrounded by a boundary edge between a respective one of the blocks 10 and the base surface 8 and smoothly connected to the surrounding base surface 8.

Figure 3:
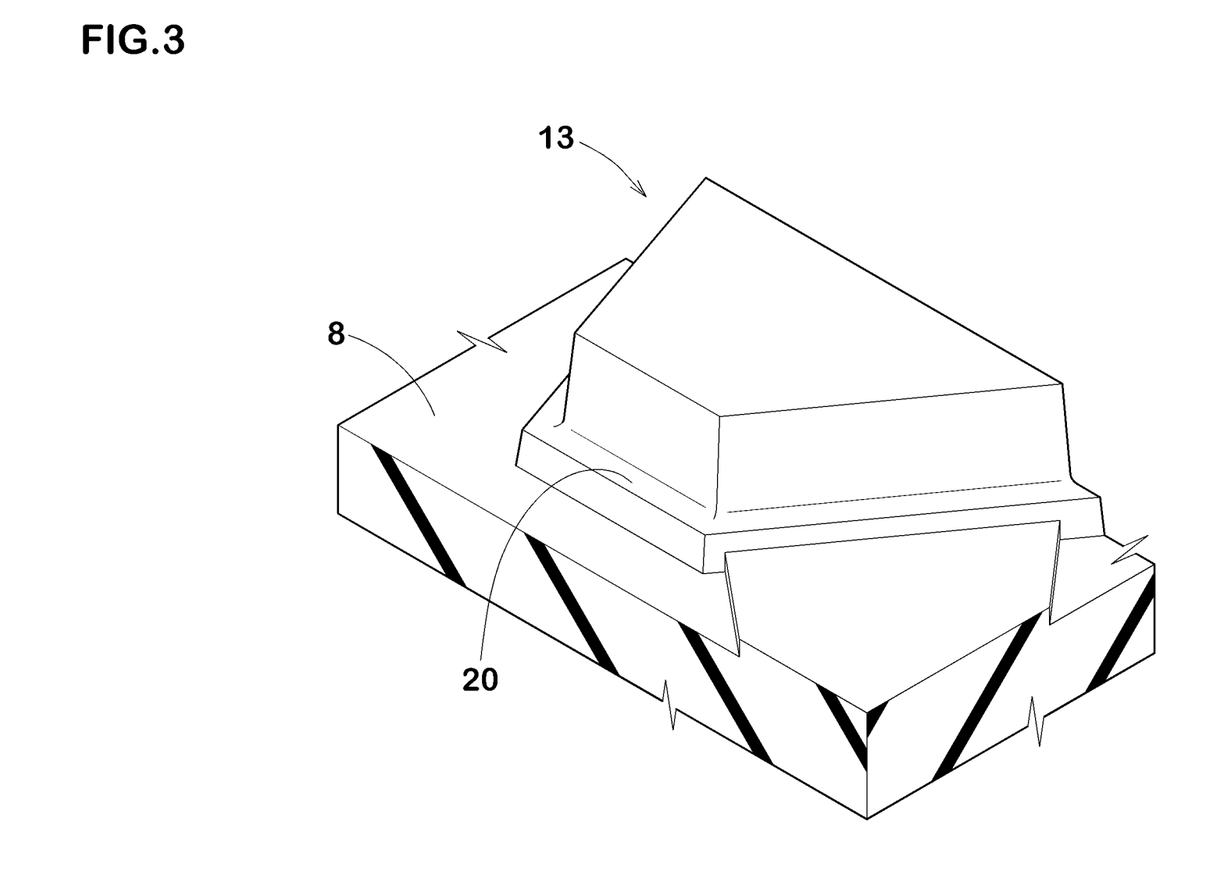
FIG. 3 an enlarged perspective view of a shoulder block of FIG. 2.

FIG. 3 is an enlarged perspective view of one of the shoulder blocks 13. As shown in FIG. 3, each of the shoulder blocks 13 is provided with a base portion 20 which has a locally increased lateral cross section taken along the base surface 8. It should be noted that, in order to make it easy to recognize the base portions 20, the base portions 20 are shaded in a plan view of the blocks of the present specification.

The tire 1 of the present invention can exert excellent traction performance and cornering performance by employing the above configuration. The following mechanisms can be inferred as reasons for this.

Generally, on a soft road surface, the entire tread portion 2 tends to be buried in the road surface. Accordingly, in a motorcycle tire for running on rough terrain, not only the crown blocks 11 but also the shoulder blocks 13 come into contact with the road surface during running straight on the soft road surface. On the other hand, in the tire 1 according to the present invention, the height (hs) of each of the shoulder blocks 13 is larger than the height (hc) of each of the crown blocks 11. Therefore, the shoulder blocks 13 pushes dirt and mud aside to provide a reaction force even during running straight on a soft road surface, thereby, excellent traction performance is exerted.

Further, the shoulder blocks 13 of the present invention have high rigidity in the root portions of the blocks since they are provided with the above-described base portions 20, therefore, larger reaction force can be exerted. Furthermore, the shoulder blocks 13 configured as such also exert large reaction force in the tire axial direction, therefore, they are helpful for improving the cornering performance as well.

A detailed configuration of the present embodiment will now be described. It should be noted that the configuration described below is not an essential element of the present invention, but shows a specific aspect of the present embodiment. Therefore, it goes without saying that the present invention can achieve the above-mentioned effects even if it does not have the configuration described below. Further, even if any one of the configurations described below is independently applied to the tire of the present invention having the above-mentioned characteristics, improvement in performance according to each configuration can be expected. Furthermore, when some of the configurations described below are applied in combination, combined improvement in the performance according to each configuration can be expected.

As shown in FIG. 1, the height (hs) of each of the shoulder blocks 13 is 103% or more, preferably 105% or more, and preferably 150% or less, more preferably 120% or less, and further preferably 110% or less of the height (hc) of each of the crown blocks 11. The shoulder blocks 13 configured as such have appropriate rigidity, therefore, they improve the traction performance and the cornering performance on the soft road surface in a good balance.

Figure 4:
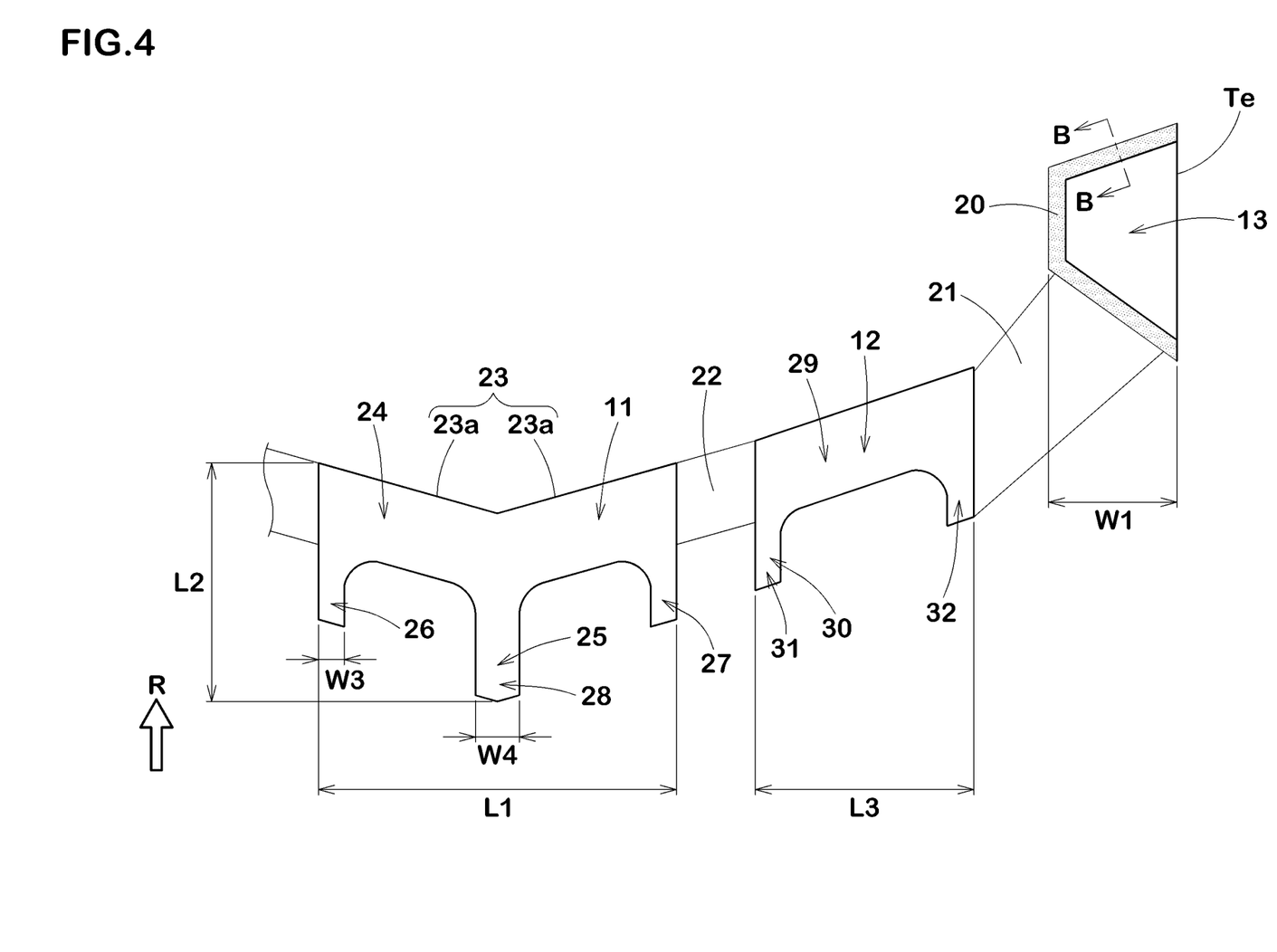
FIG. 4 an enlarged plan view of the shoulder block, a crown block, and a middle block of FIG. 2.

FIG. 4 is an enlarged plan view of one of the shoulder blocks 13, one of the crown blocks 11, and one of the middle blocks 12. As shown in FIG. 4, the ground contacting surface of each of the shoulder blocks 13 in the present embodiment has a rectangular shape and preferably has a trapezoidal shape, for example. The ground contacting surface of each of the shoulder blocks 13 in the present embodiment includes two edges extending parallel to a tire circumferential direction. A length in the tire circumferential direction of each of the shoulder blocks 13 is increased toward a respective one of the tread edges (Te). Each of the shoulder blocks 13 configured as such has the rigidity increased toward a respective one of the tread edges (Te), therefore, a response when a camber angle of a vehicle body is increased can be linearized.

In each of the shoulder blocks 13 in the present embodiment, the base portion 20 is not provided on a side surface on the respective tread edge (Te) side of the shoulder block 13 but the base portion 20 is provided in the other regions. It is made easy for each of the shoulder blocks 13 configured as such to appropriately deflect toward a respective one of the tread edges (Te), therefore, it is made easy for the driver to grasp behavior of the vehicle body during cornering in the vicinity of a maximum camber angle.

Figure 5:
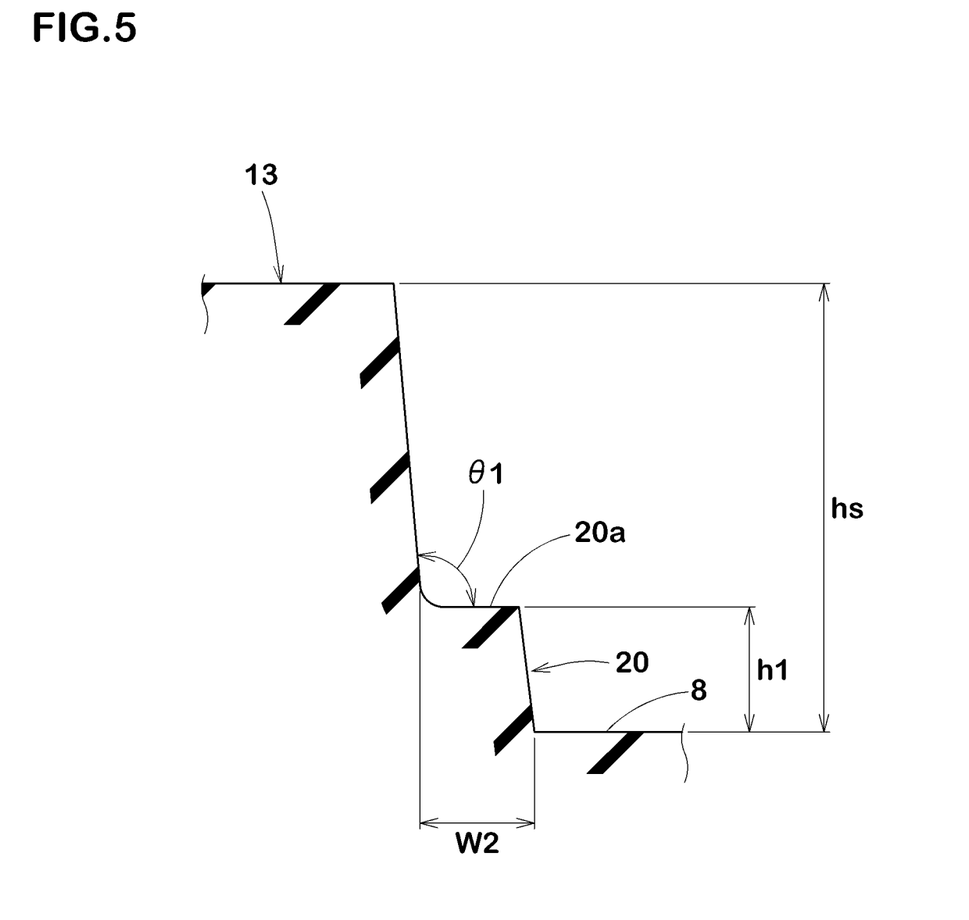
FIG. 5 a cross-sectional view taken along B-B line of FIG. 4.

FIG. 5 shows a cross-sectional view taken along B-B line of FIG. 4. It should be noted that FIG. 5 is a diagram showing a lateral cross section of the base portion 20 taken perpendicular to the base surface 8. As shown in FIG. 5, the base portion 20 has a stepwise contour in the lateral cross section. It is preferred that the contour of the base portion 20 has a stepwise shape having three or less steps, for example, and the contour of the base portion 20 in the present embodiment has a stepwise shape having one step.

A raised height (h1) of each of the base portions 20 is 5% and more and 50% or less, and preferably 5% or more and 15% or less of the height (hs) of each of the shoulder blocks 13. The base portions 20 configured as such can increase the rigidity of the shoulder blocks 13 while maintaining ease of sticking of the shoulder block 13 into a road surface.

In each of the shoulder blocks 13, a protrusion width (W2), along the base surface 8 from the shoulder block 13, of the base portion 20 is 5% or more and 15% or less of a width (W1) (shown in FIG. 4) in the tire axial direction of the shoulder blocks 13, for example. The base portions 20 can increase the rigidity of the shoulder blocks 13 without excessively impairing an sticking amount of the shoulder blocks 13 into the road surface.

The base portion 20 includes an outer surface (20a) extending along the base surface 8. An intersection angle θ1 between a side surface of the shoulder block 13 and the outer surface (20a) is 90 degrees or more and 130 degrees or less, for example. Thereby, it is made easier for the shoulder blocks 13 to stick into the road surface, therefore, the traction performance and the cornering performance are improved.

As shown in FIG. 4, it is preferred that the tread portion 2 includes shoulder tie bars 21 which are formed by the raised base surface 8 and each of which connects one of the shoulder blocks 13 with its axially adjacent one of the middle blocks 12. The shoulder tie bars 21 configured as such suppress deformation in the vicinities of root portions of the shoulder blocks 13 and the middle blocks 12. Further, the shoulder tie bars 21 also exert an effect of pushing mud aside, therefore, they are helpful for improving the traction performance as well.

It is preferred that each of the shoulder tie bars 21 is connected to a respective one of the base portions 20. A height of each of the shoulder tie bars is smaller than a height of each of the base portions 20. Specifically, the height of each of the shoulder tie bars 21 is 50% or more and 90% or less of the height of each of the base portions 20. As a result, mud can be prevented from being adhered to and retained in the periphery of the shoulder blocks 13.

In each of the shoulder tie bars 21, a width thereof is decreased from the shoulder block 13 toward the middle block 12, for example. The shoulder tie bars 21 configured as such are helpful for linearizing a response in tilting in the vicinity of the maximum camber angle.

It is preferred that each of the shoulder block 13 is connected with only one shoulder tie bar 21. Thereby, dirt and mud pushed aside by the one shoulder tie bar 21 are easily discharged, therefore, an excellent traction performance and cornering performance are continuously exerted.

In each of the crown blocks 11 in the present embodiment, a length L2 in the tire circumferential direction is smaller than a length L1 in the tire axial direction. Specifically, it is preferred that the length L2 in the tire circumferential direction of the crown block 11 is 40% or more and 90% or less of the length L1. The crown blocks 11 configured as such are helpful for improving the traction performance.

It is preferred that, in each of the crown blocks 11, a side surface 23 facing a heel side in the rotational direction (R) (hereinafter, may be simply referred to as the "heel side") is convex toward a toe side in the rotational direction (R) (hereinafter, may be simply referred to as the "toe side"). The side surface 23 of the present embodiment is composed of two planes (23a) which are inclined in opposite sides with respect to the tire axial direction and are connected via a ridge line, for example. An angle of each of the planes (23a) with respect to the tire axial direction is 5 degrees or more and 25 degrees or less, for example. The side surface 23 configured as such exerts a large reaction force when pushing away mud and soil during running on rough terrain.

Each of the crown blocks 11 in the present embodiment includes a block main body 24 and at least one fin portion 25 extending in the tire circumferential direction with a width in the tire axial direction smaller than that of the block main body. The fin portion 25 is provided on the toe side of the block main body 24, for example. The fin portion 25 configured as such effectively prevents the block from collapsing toward the toe side, therefore, excellent traction performance is exerted.

Each of the crown blocks 11 in the present embodiment includes three fin portions 25, for example.

Specifically, each of the crown blocks 11 includes a first fin portion 26 arranged on one side in the tire axial direction, a second fin portion 27 arranged on the other side in the tire axial direction, and a third fin portion 28 arranged between them.

The first fin portion 26 is connected to the side surface arranged on one side in the tire axial direction of the block main body 24. The second fin portion 27 is connected to the side surface arranged on the other side in the tire axial direction of the block main body 24. The first fin portion 26 and the second fin portion 27 are configured to have substantially the same shape.

The third fin portion 28 is connected to the center portion in the tire axial direction of the block main body 24. In this embodiment, the crown blocks 11 are arranged on the tire equator (C), and the third fin portions 28 included in the crown blocks 11 are arranged on the tire equator (C). In a more preferred embodiment, the centroid of the ground contacting surface of each of these blocks is located within a region obtained by extending the third fin portion 28 parallel to the tire circumferential direction towards the heel side. As a result, the third fin portion 28 effectively suppresses the collapse of the block main body 24, therefore, excellent traction performance is exerted.

In order to ensure that the above effect is exerted, a length in the tire circumferential direction of the third fin portion 28 is larger than each of lengths in the tire circumferential direction of the first fin portion 26 and the second fin portion 27, for example. The third fin portion 28 protrudes more to the toe side than the first fin portion 26 and the second fin portion 27.

A width (W4) in the tire axial direction of the third fin portion 28 is larger than each of widths in the tire axial direction of the first fin portion 26 and the second fin portion 27, for example. Specifically, the width (W4) of the third fin portion 28 is 130% or more and 200% or less of a width (W3) of the first fin portion 26, for example. Thereby, it is possible that mud and soil are prevented from being retained around the finned blocks by the third fin portion 28 suppressing the collapse of the block main body 24 and the first fin portion 26 and the second fin portion 27 being deformed moderately.

As shown in FIG. 1, it is preferred that a height (hm) of each of the middle blocks 12 from the base surface 8 is smaller than the height (hs) of each of the shoulder blocks 13. The height (hm) is 90% or more and 95% or less of the height (hs). As a result, a response in tilting the vehicle body is made linear, thereby, the cornering performance is improved.

As shown in FIG. 4, each of the middle blocks 12 in the present embodiment includes a block main body 29 and at least one fin portion 30 extending in the tire circumferential direction with a width in the tire axial direction smaller than that of the block main body 29. The fin portion 30 is provided on the toe side of the block main body 29, for example. The fin portions 30 configured as such effectively prevent the middle blocks 12 from collapsing toward the toe side, therefore, they are helpful for exerting excellent traction performance.

Each of the middle blocks 12 includes a first fin portion 31 arranged on one side in the tire axial direction and a second fin portion 32 arranged on the other side in the tire axial direction, for example. On the other hand, the middle blocks 12 do not include the third fin portions, unlike the crown blocks 11. The middle blocks 12 configured s such are deformed more easily than the crown blocks 11, therefore, dirt and mud can be prevented from being retained in the periphery of the middle blocks.

Each of lengths in the tire circumferential direction of the first fin portion 31 and the second fin portion 32 of each of the middle blocks 12 is smaller than a length in the tire circumferential direction of the third fin portion 28 of each of the crown blocks 11. Each of the lengths in the tire circumferential direction of the first fin portion 31 and the second fin portion 32 of each of the middle blocks 12 is the same as each of lengths in the tire circumferential direction of the first fin portion 26 and the second fin portion 27 of each of the crown blocks 11.

As a result, changes in traction during running straight and cornering are linearized.

A side surface of each of the middle blocks 12 facing the heel side in the rotational direction (R) is inclined toward the heel side as it goes from the tire equator (C) to a respective one of the tread edges (Te), for example. Further, the centroids on the ground contacting surfaces of the middle blocks 12 are located on the heel side of the centroids of the ground contacting surfaces of the crown blocks 11. Therefore, the crown blocks 11 can further push away mud and soil which have been pushed away by the middle blocks 12 toward the tire equator (C), thereby, the traction performance is further improved.

It is preferred that a length L3 in the tire axial direction of each of the middle blocks 12 is smaller than a length L4 in the tire axial direction of each of the crown blocks 11. Specifically, the length L3 of each of the middle blocks 12 is 50% or more and 80% or less of the length L4 of each of the crown blocks 11.

The tread portion 2 in the present embodiment includes crown tie bars 22 in addition to the above-described shoulder tie bars 21, for example. Each of the crown tie bars 22 is formed by the raised base surface 8 and connects one of the crown blocks 11 with its axially adjacent one of the middle blocks 12. The crown tie bars 22 configured as such exert an effect of pushing dirt and mud aside, therefore, they are helpful for improving the traction performance.

Each of the crown tie bars 22 extends with a predetermined width between one of the crown blocks 11 and one of the middle blocks 12 axially adjacent to each other, for example. The crown tie bars 22 configured as such are helpful for suppressing uneven wear of the crown blocks 11 and the middle blocks 12.

While detailed description has been made of preferred embodiments of the motorcycle tire for running on rough terrain according to the present invention, the present invention can be embodied in various forms without being limited to the illustrated embodiments.

WORKING EXAMPLES (EXAMPLES)

Motorcycle tires for running on rough terrain for rear wheels having the basic pattern shown in FIG. 2 were made by way of test according to the specifications listed in Table 1.

Figure 6:
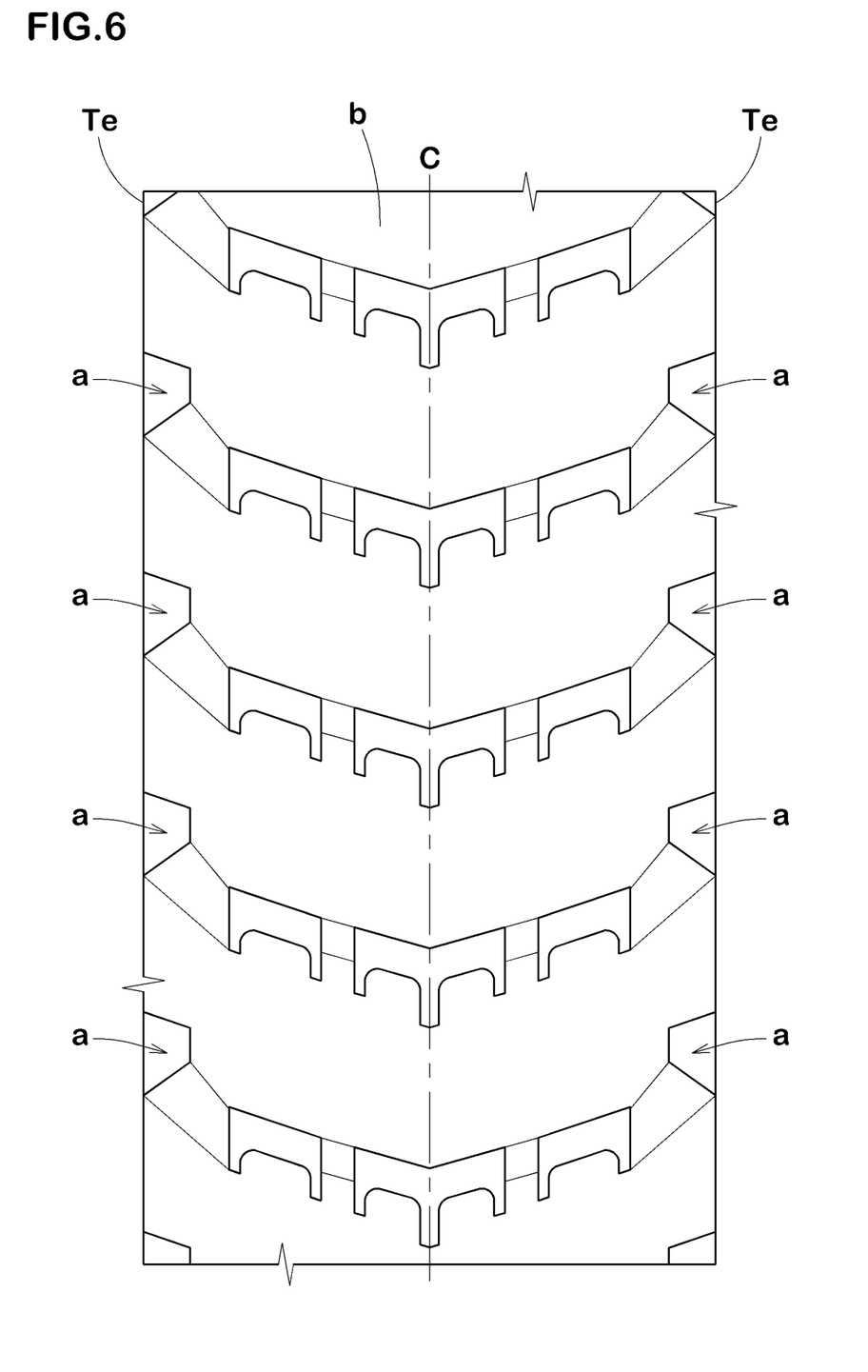
FIG. 6 a development view of the tread portion of a motorcycle tire for running on rough terrain in Reference.

As Reference 1 and Reference 2, as shown in FIG. 6, tires in which each of shoulder blocks (a) is not provided with a base portion were made by way of test.

It should be noted that in the tire in the Reference 1, the height (hs) is the same as the above-described height (hm).

In the tires in the Reference 2, the height (hs) is larger than the height (hm).

The tires in the Reference 1 and the Reference 2 had substantially the same tread pattern as that shown in FIG. 2, except for the above points.

Each of the test tires was tested for the traction performance and the cornering performance. Common specifications and test methods for each test tire are as follows.

Vehicle used: Motocross competition vehicle with displacement of 450 cc
    Tire size: 120/80-19
    Rim size: 2.15 WM
    Tire inner pressure: 80 kPa
    The test methods were as follows.

<Traction Performance>

While the above test vehicle was driven on the soft road surface, the traction performance was evaluated by the test rider's feeling. The results are indicated by an evaluation point based on the Reference 1 being 100, wherein the larger the numerical value, the better the traction performance is.

<Cornering Performance>

While the above test vehicle was driven on the soft road surface, the cornering performance was evaluated by the test rider's feeling. The results are indicated by an evaluation point based on the Reference 1 being 100, wherein the larger the numerical value, the better the cornering performance is.

The test results are shown in Table 1.

TABLE 1

|  | Ref. 1 | Ref. 2 | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- | --- | --- |
| Figure showing tread pattern | Fig. 6 | Fig. 6 | Fig. 2 | Fig. 2 | Fig. 2 | Fig. 2 | Fig. 2 | Fig. 2 | Fig. 2 | Fig. 2 | Fig. 2 |
| Height (hs) of Shoulder block/Height (hc) of Crown block [%] | 100 | 105 | 105 | 103 | 110 | 115 | 120 | 105 | 105 | 105 | 105 |
| Raised height (h1) of base portion/Height (hs) of Shoulder block [%] | — | — | 7 | 7 | 7 | 7 | 7 | 5 | 10 | 15 | 20 |
| Traction performance [evaluation point] | 100 | 104 | 112 | 109 | 112 | 112 | 110 | 110 | 112 | 111 | 110 |
| Cornering performance [evaluation point] | 100 | 102 | 110 | 106 | 110 | 109 | 108 | 109 | 110 | 110 | 110 |

As can be clearly seen from Table 1, it was confirmed that the tires in the Examples exerted excellent traction performance and excellent cornering performance.

DESCRIPTION OF REFERENCE SIGNS 2 tread portion
8 base surface
10 block
11 crown block
13 shoulder block
20 base portion
hs height of shoulder block
hc height of crown block

The invention claimed is:

1. A motorcycle tire for running on rough terrain comprising a tread portion, wherein
the tread portion includes a base surface and a plurality of blocks protruding outward in a tire radial direction from the base surface,
the blocks include a crown block arranged on a tire equator side and a shoulder block arranged on a tread edge side,
a height (hs) of the shoulder block from the base surface is larger than a height (hc) of the crown block from the base surface,
the shoulder block is provided on the base surface side with a base portion that has a locally increased cross-section taken along the base surface,
the base portion has a stepwise contour in a lateral cross section taken perpendicular to the base surface,
the stepwise contour at least includes a first surface, a second surface, and a third surface,
the first surface extends radially inward from an edge of a ground contacting surface of the shoulder block,
the second surface is connected with a radially inner end of the first surface and extends therefrom along the base surface,
the third surface is connected with a farther end of the second surface from the first surface and extends radially inward therefrom,
the blocks include a middle block arranged between the crown block and the shoulder block,
the tread portion includes a shoulder tie bar formed by a raised base surface and connecting the shoulder block with the middle block, and
a height of the shoulder tie bar is smaller than a height of the base portion.

2. The motorcycle tire according to claim 1, wherein the height (hs) is 105% or more and 150% or less of the height (hc).

3. The motorcycle tire according to claim 1, wherein the shoulder tie bar is connected to the base portion.

4. The motorcycle tire according to claim 1, wherein the shoulder block is connected with only one shoulder tie bar.

5. The motorcycle tire according to claim 1, wherein
a height (hm) of the middle block from the base surface is smaller than the height (hs).

6. The motorcycle tire according to claim 1, wherein
the tread portion includes a crown tie bar formed by the raised base surface and connecting the crown block and the middle block.

7. The motorcycle tire according to claim 1, wherein the crown blocks are provided on the tire equator.

8. The motorcycle tire according to claim 1, wherein the height (hs) of the shoulder block is 103% or more and 150% or less of the height (hc) of the crown block.

9. The motorcycle tire according to claim 1, wherein
a ground contacting surface of the shoulder block has a trapezoidal shape.

10. The motorcycle tire according to claim 1, wherein
a length in a tire circumferential direction of the shoulder block is increased toward the tread edge.

11. The motorcycle tire according to claim 1, wherein
a raised height (h1) of the base portion is 5% or more and 50% or less of the height (hs) of the shoulder block.

12. The motorcycle tire according to claim 1, wherein
a protrusion width (W2), along the base surface from the shoulder block, of the base portion is 5% or more and 15% or less of a width (W1) in the tire axial direction of the shoulder block.
13. The motorcycle tire according to claim 1, wherein
the height of the shoulder tie bar is 50% or more and 90% or less of the height of the base portion.
14. The motorcycle tire according to claim 1, wherein
a width of the shoulder tie bar is decreased from the shoulder block toward the middle block.
15. The motorcycle tire according to claim 1, wherein
a length L2 in the tire circumferential direction of the crown block is 40% or more and 90% or less of a length L1 in the tire axial direction of the crown block.
16. The motorcycle tire according to claim 1, wherein
the crown block has a side surface facing a heel side in a rotational direction of the tire which is convex toward a toe side in the rotational direction.
17. The motorcycle tire according to claim 16, wherein
the side surface is composed of two planes which are inclined in opposite sides with respect to the tire axial direction and are connected via a ridge line, and
an angle of each of the planes with respect to the tire axial direction is 5 degrees or more and 25 degrees or less.
18. The motorcycle tire according to claim 1, wherein
an intersection angle between the first surface and the second surface is 90 degrees or more and 130 degrees or less.

\* \* \* \* \*